(12) United States Patent
Zhang et al.

(10) Patent No.: US 11,765,018 B2
(45) Date of Patent: Sep. 19, 2023

(54) CONTROL PLANE DEVICE SWITCHING METHOD AND APPARATUS, AND FORWARDING-CONTROL SEPARATION SYSTEM

(71) Applicant: Huawei Technologies Co., Ltd., Shenzhen (CN)

(72) Inventors: Yaokun Zhang, Beijing (CN); Pingan Yang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 157 days.

(21) Appl. No.: 17/181,167

(22) Filed: Feb. 22, 2021

(65) Prior Publication Data
US 2021/0176117 A1    Jun. 10, 2021

Related U.S. Application Data

(63) Continuation of application No. PCT/CN2019/101240, filed on Aug. 18, 2019.

(30) Foreign Application Priority Data

Aug. 23, 2018    (CN) .......................... 201810969568.2

(51) Int. Cl.
*H04L 41/0668* (2022.01)
*H04L 1/20* (2006.01)
*H04L 1/22* (2006.01)

(52) U.S. Cl.
CPC ............ *H04L 41/0668* (2013.01); *H04L 1/20* (2013.01); *H04L 1/22* (2013.01)

(58) Field of Classification Search
None
See application file for complete search history.

(56) References Cited

U.S. PATENT DOCUMENTS 9,049,256 B1 * 6/2015 Sharma ............... G06F 11/2005
2003/0058849 A1   3/2003 Verbesselt
(Continued)

FOREIGN PATENT DOCUMENTS

CN    102255740 A    11/2011
CN    102257848 A    11/2011
(Continued)

OTHER PUBLICATIONS

Bradner, S., et al., "Benchmarking Methodology for Network Interconnect Devices," RFC 2544, Mar. 1999, 31 pages.

*Primary Examiner* — Edan Orgad
*Assistant Examiner* — Emmanuel K Maglo
(74) *Attorney, Agent, or Firm* — Conley Rose, P.C.

(57) ABSTRACT

A control plane (CP) device switching method includes that when a user plane (UP) device in a forwarding-control separation system detects that performance of communication between the UP device and an active CP device does not meet a normal communication condition, and performance of communication between the UP device and a standby CP device meets the normal communication condition, the UP device sends a switching request to the standby CP device. When detecting that a quantity of UP devices that each send the switching request is greater than or equal to a first quantity threshold, the standby CP device may indicate each UP device in the forwarding-control separation system to switch to the standby CP device.

23 Claims, 4 Drawing Sheets

(56) References Cited

U.S. PATENT DOCUMENTS

| | | | |
|---|---|---|---|
| 2006/0056303 A1* | 3/2006 | Aggarwal | H04L 41/0677 370/248 |
| 2007/0150613 A1* | 6/2007 | Lobig | H04L 43/00 709/238 |
| 2008/0049621 A1* | 2/2008 | McGuire | H04L 41/00 370/236.2 |
| 2009/0019140 A1* | 1/2009 | Lobig | H04L 41/0668 709/239 |
| 2010/0039932 A1* | 2/2010 | Wen | H04L 41/044 370/217 |
| 2010/0061226 A1 | 3/2010 | Morishige et al. | |
| 2011/0080891 A1 | 4/2011 | Cai et al. | |
| 2012/0198096 A1 | 8/2012 | Leng et al. | |
| 2013/0287389 A1* | 10/2013 | Ayandeh | H04L 49/357 398/5 |
| 2015/0263884 A1* | 9/2015 | Sharma | H04L 49/25 370/221 |
| 2015/0278047 A1 | 10/2015 | Zhou | |
| 2015/0319666 A1 | 11/2015 | Kang et al. | |
| 2016/0099827 A1* | 4/2016 | Ayandeh | H04L 45/28 370/228 |
| 2017/0118041 A1* | 4/2017 | Bhattacharya | H04L 41/0895 |
| 2020/0042410 A1* | 2/2020 | Gupta | H04L 67/1097 |
| 2021/0176117 A1 | 6/2021 | Zhang et al. | |

FOREIGN PATENT DOCUMENTS

| | | |
|---|---|---|
| CN | 102724695 A | 10/2012 |
| CN | 103414641 A | 11/2013 |
| CN | 103812675 A | 5/2014 |
| CN | 104038362 A | 9/2014 |
| CN | 104821913 A | 8/2015 |
| CN | 106603261 A | 4/2017 |
| CN | 106685676 A | 5/2017 |
| CN | 106937323 A | 7/2017 |
| CN | 107733728 A | 2/2018 |
| CN | 108011754 A | 5/2018 |
| CN | 108075971 A | 5/2018 |
| CN | 108880917 A | 11/2018 |
| EP | 3035735 A1 | 6/2016 |

* cited by examiner

CONTROL PLANE DEVICE SWITCHING METHOD AND APPARATUS, AND FORWARDING-CONTROL SEPARATION SYSTEM

CROSS-REFERENCE TO RELATED APPLICATIONS

This application is a continuation of International Patent Application No. PCT/CN2019/101240 filed on Aug. 18, 2019, which claims priority to Chinese Patent Application No. 201810969568.2 filed on Aug. 23, 2018. The disclosures of the aforementioned applications are hereby incorporated by reference in their entireties.

TECHNICAL FIELD

This application relates to the communications field, and in particular, to a control plane device switching method and apparatus, and a forwarding-control separation system.

BACKGROUND

A broadband remote access server (BRAS) is a new access gateway oriented to a broadband network application. The BRAS is deployed in a manner in which a control plane (CP) device and a user plane (UP) device are separated (CU separation). In a BRAS system with CU separation deployment, a plurality of UP devices is deployed in a distributed manner, to forward a user data packet. CP devices may be implemented by using a cloudification technology and deployed in a centralized manner, to implement user control and management, and manage the plurality of UP devices together. The UP device may also be referred to as a forwarding plane device. Therefore, the CU separation deployment may also be referred to as forwarding-control separation deployment, and the system with CU separation deployment is also referred to as a forwarding-control separation system.

In a related technology, to ensure data security, an active CP device and a standby CP device are usually deployed in the BRAS system. All data of the active CP device is backed up in the standby CP device, and an active/standby communication protocol such as a Virtual Router Redundancy Protocol (VRRP) may be deployed between the standby CP device and the active CP device. When the standby CP device detects, based on the active/standby communication protocol, that the active CP device is faulty, the standby CP device may indicate each UP device to switch to the standby CP device. In other words, the standby CP device may automatically replace the active CP device.

However, in the related technology, a CP device switching method based on fault detection has relatively low flexibility.

SUMMARY

This application provides a control plane device switching method and apparatus, and a forwarding-control separation system, to resolve a problem that a CP device switching method has relatively low flexibility in a related technology. The technical solutions are as follows.

According to one aspect, this application provides a control plane device switching method. The method may be applied to a UP device in a forwarding-control separation system. The forwarding-control separation system may further include an active CP device and a standby CP device.

The method may include the following. The UP device detects performance of communication between the UP device and the active CP device and performance of communication between the UP device and the standby CP device. When detecting that the performance of communication between the UP device and the active CP device does not meet a normal communication condition, and the performance of communication between the UP device and the standby CP device meets the normal communication condition, the UP device sends a switching request to the standby CP device. When receiving a switching instruction sent by the standby CP device, the UP device may switch to the standby CP device according to the switching instruction.

The switching instruction may be associated with the fact that a quantity of UP devices that each send the switching request is greater than or equal to a first quantity threshold. For example, the switching instruction may be sent by the standby CP device after the standby CP device detects that the quantity of UP devices that each send the switching request is greater than or equal to the first quantity threshold.

According to the control plane device switching method provided in this application, the UP device may separately detect the performance of communication between the UP device and the active CP device and the performance of communication between the UP device and the standby CP device, and may send the switching request to the standby CP device. In addition, the UP device may switch to the standby CP device according to the switching instruction sent by the standby CP device. Therefore, it can be ensured that the UP device normally communicates with the standby CP device, and it can be further ensured that the standby CP device can normally process a user service, so that normal user service processing is prevented from being affected when the performance of communication between the UP device and the active CP device degrades. The control plane device switching method provided in this application has relatively high flexibility, and effectively improves reliability of the forwarding-control separation system.

In an optional implementation, when detecting that a quantity of data packet retransmissions to the active CP device within preset duration is greater than or equal to a retransmission quantity threshold, the UP device may detect the performance of communication between the UP device and the active CP device and the performance of communication between the UP device and the standby CP device.

Compared with a mechanism in which the UP device monitors in real time the performance of communication between the UP device and the active CP device and the performance of communication between the UP device and the standby CP device, in a mechanism of triggering performance monitoring based on the quantity of retransmissions, fewer resources of the UP device may be occupied, thereby effectively reducing resource consumption of the UP device.

In another optional implementation, after receiving a detection instruction sent by the standby CP device, the UP device may detect the performance of communication between the UP device and the active CP device and the performance of communication between the UP device and the standby CP device.

The detection instruction may be periodically sent by the standby CP device to the UP device based on a preset detection period. Therefore, the standby CP device may monitor, by periodically sending the detection instruction, the performance of communication between the UP device and the active CP device and the performance of communication between the UP device and the standby CP device.

Alternatively, the detection instruction may be sent by the standby CP device after the standby CP device detects that the quantity of UP devices that each send the switching request is greater than or equal to a second quantity threshold.

After detecting that the quantity of UP devices that each send the switching request is greater than or equal to the second quantity threshold, the standby CP device may send a detection instruction to a UP device that does not send a switching request in the forwarding-control separation system, so that performance of communication between another UP device and the active CP device can be further determined, thereby ensuring switching reliability.

Optionally, the forwarding-control separation system may further include a network management device. After the UP device detects the performance of communication between the UP device and the active CP device and the performance of communication between the UP device and the standby CP device, the method may further include the following.

When detecting that the performance of communication between the UP device and the active CP device does not meet the normal communication condition, and the performance of communication between the UP device and the standby CP device does not meet the normal communication condition either, the UP device may report alarm information to the network management device, where the alarm information is used to indicate that communication of the UP device is abnormal.

When detecting that neither of the performance of communication between the UP device and the active CP device and the performance of communication between the UP device and the standby CP device meets the normal communication condition, the UP device may determine that communication performance of the UP device may be abnormal. Therefore, the UP device reports the alarm information to the network management device, so that a network administrator that monitors the network management device can detect and repair the UP device in time based on the alarm information, thereby further ensuring reliability of the forwarding-control separation system.

Optionally, within a first time period after the switching request is sent to the standby CP device, the UP device may further continue to detect the performance of communication between the UP device and the active CP device and the performance of communication between the UP device and the standby CP device. When detecting, within the first time period, that the performance of communication between the UP device and the active CP device meets the normal communication condition, the UP device may send a switching cancellation request to the standby CP device. The switching cancellation request may be used to indicate to withdraw a switching request previously sent by the UP device.

The UP device continues to monitor the communication performance within the first time period after sending the switching request, so that communication performance detection accuracy can be ensured. When detecting that the performance of communication between the UP device and the active CP device meets the normal communication condition, the UP device may send the switching cancellation request to withdraw the previously sent switching request, so as to ensure accuracy of calculating, by the standby CP device, the quantity of UP devices that each send the switching request.

Optionally, a process in which the UP device detects the performance of communication between the UP device and the active CP device and the performance of communication between the UP device and the standby CP device may include detecting a value of at least one communication performance parameter of communication between the UP device and the active CP device and a value of at least one communication performance parameter of communication between the UP device and the standby CP device.

Correspondingly, that communication performance meets the normal communication condition may mean that a quantity of communication performance parameters that are in the at least one communication performance parameter and whose values are within a corresponding normal value range is greater than or equal to a preset quantity threshold. That communication performance does not meet the normal communication condition may mean that a quantity of communication performance parameters that are in the at least one communication performance parameter and whose values are within a corresponding normal value range is less than the preset quantity threshold.

The at least one communication performance parameter may include at least one of the following parameters: a packet loss rate, a packet error ratio, a communication delay, and the like. The preset quantity threshold may be flexibly adjusted based on a performance requirement of the forwarding-control separation system. For example, the preset quantity threshold may be 1 or 3.

According to another aspect, this application provides a CP device switching method. The method may be applied to a standby CP device in a forwarding-control separation system. The forwarding-control separation system may further include an active CP device and a plurality of UP devices. The method may include the following.

The standby CP device receives a switching request sent by at least one UP device, and detects whether a quantity of UP devices that each send the switching request is greater than or equal to a first quantity threshold. The switching request sent by any UP device may be used to indicate that performance of communication between the any UP device and the active CP device does not meet a normal communication condition, and performance of communication between the any UP device and the standby CP device meets the normal communication condition. When detecting that the quantity of UP devices that each send the switching request is greater than or equal to the first quantity threshold, the standby CP device may separately send a switching instruction to each of the plurality of UP devices, where the switching instruction is used to instruct a UP device that receives the switching instruction to switch to the standby CP device.

According to the control plane device switching method provided in this application, when the quantity of UP devices that each send the switching request is greater than or equal to the first quantity threshold, the standby CP device may indicate each UP device in the forwarding-control separation system to switch to the standby CP device. Therefore, it can be ensured that the UP device normally communicates with the standby CP device, and it can be further ensured that the standby CP device can normally process a user service, so that normal user service processing is prevented from being affected when the performance of communication between the UP device and the active CP device degrades. The control plane device switching method provided in this application has relatively high flexibility, and effectively improves reliability of the forwarding-control separation system.

Optionally, before the standby CP device detects whether the quantity of UP devices that each send the switching request is greater than or equal to the first quantity threshold, the method may further include the following.

When detecting that the quantity of UP devices that each send the switching request is greater than or equal to a second quantity threshold, the standby CP device sends a detection instruction to a UP device that is in the plurality of UP devices and that does not send a switching request, where the detection instruction is used to instruct the UP device that does not send a switching request to detect performance of communication between the UP device and the active CP device and performance of communication between the UP device and the standby CP device.

After detecting that the quantity of UP devices that each send the switching request is greater than or equal to the second quantity threshold, the standby CP device may send the detection instruction to the UP device that does not send the switching request in the forwarding-control separation system, so that performance of communication between another UP device and the active CP device can be further determined, thereby ensuring switching reliability.

In an optional implementation, when detecting whether the quantity of UP devices that each send the switching request is greater than or equal to the first quantity threshold, the standby CP device may detect whether a sum of a quantity of UP devices that each send the switching request before the detection instruction is sent and a quantity of UP devices that each send the switching request within a second time period after the detection instruction is sent is greater than or equal to the first quantity threshold, where the first quantity threshold may be greater than the second quantity threshold, and both the first quantity threshold and the second quantity threshold may be determined based on a total quantity of UP devices included in the forwarding-control separation system.

In another optional implementation, when detecting whether the quantity of UP devices that each send the switching request is greater than or equal to the first quantity threshold, the standby CP device may detect, beyond a second time period after the detection instruction is sent, whether a quantity of UP devices that each send the switching request within the second time period is greater than or equal to the first quantity threshold.

Optionally, the standby CP device may detect, within a specified time period, whether a quantity of UP devices that each send the switching request is greater than or equal to the first quantity threshold. If detecting that the quantity of UP devices that each send the switching request within the specified time period is less than the first quantity threshold, the standby CP device may send a switching cancellation instruction to each UP device that sends the switching request. The switching cancellation instruction is used to indicate that the UP device currently does not meet a switching condition. After receiving the switching cancellation instruction, the UP device may keep a current state unchanged, or may send a switching cancellation request to the standby CP device.

The specified time period may be a time period starting from a moment at which the standby CP device receives the first switching request, or may be a time period starting from a moment at which a switching cancellation instruction is sent last time. Alternatively, in a case in which the standby CP device periodically sends a detection instruction, the specified time period may be a time period starting from a moment at which the detection instruction is sent. In a case in which the standby CP device sends the detection instruction to the UP device that does not send the switching request, the specified time period may be the second time period, or the specified time period may include the second time period and a time period that is required by the standby CP device to detect that the quantity of UP devices that each send the switching request is greater than or equal to the second quantity threshold.

Optionally, after receiving the switching request sent by the UP device, when receiving a switching cancellation request sent by the UP device that sends the switching request, the standby CP device may determine that the UP device that sends the switching cancellation request is the UP device that does not send the switching request.

The switching cancellation request is sent by the UP device when the UP device detects that performance of communication between the UP device and the active CP device meets the normal communication condition, and the switching cancellation request may be used to indicate to withdraw the switching request previously sent by the UP device. Therefore, the standby CP device determines that the UP device that sends the switching cancellation request is the UP device that does not send the switching request, so that accuracy of calculating the quantity of UP devices that each send the switching request can be ensured, thereby ensuring switching reliability.

Optionally, the forwarding-control separation system may be a forwarding-control separation BRAS system.

According to still another aspect, a UP device is provided. The UP device may be applied to a forwarding-control separation system. The forwarding-control separation system may further include an active CP device and a standby CP device. The UP device may include at least one module, and the at least one module may be configured to implement the control plane device switching method that is applied to the UP device and that is provided in the foregoing aspect.

According to yet another aspect, a standby CP device is provided. The standby CP device may be applied to a forwarding-control separation system. The forwarding-control separation system may further include an active CP device and a plurality of UP devices. The standby CP device may include at least one module, and the at least one module may be configured to implement the control plane device switching method that is applied to the standby CP device and that is provided in the foregoing aspect.

According to yet another aspect, a CP device switching apparatus is provided. The apparatus may include a memory, a processor, and a computer program that is stored in the memory and that can run on the processor. When the processor executes the computer program, the processor implements the control plane device switching method provided in the foregoing aspects.

According to yet another aspect, a forwarding-control separation system is provided. The system may include an active CP device, the standby CP device provided in the foregoing aspect, and a plurality of UP devices provided in the foregoing aspect.

According to yet another aspect, a computer-readable storage medium is provided. The computer-readable storage medium stores an instruction, and when the computer-readable storage medium is run on a computer, the computer is enabled to perform the control plane device switching method provided in the foregoing aspects.

According to yet another aspect, a computer program product including an instruction is provided, and when the computer program product is run on a computer, the computer is enabled to perform the control plane device switching method provided in the foregoing aspects.

In conclusion, this application provides the control plane device switching method and apparatus, and the forwarding-control separation system. When performance of communication between the active CP device and each of a large quantity of UP devices in the forwarding-control separation system degrades, and performance of communication between the standby CP device and each of the large quantity of UP devices is relatively good, each UP device in the forwarding-control separation system may switch to the standby CP device according to the switching instruction sent by the standby CP device, so that the standby CP device can replace the active CP device to work. This ensures normal user service running. Compared with a method in the related technology, the control plane device switching method in this application not only has relatively high flexibility, but also can effectively improve reliability of the forwarding-control separation system.

DESCRIPTION OF EMBODIMENTS

Figure 1:
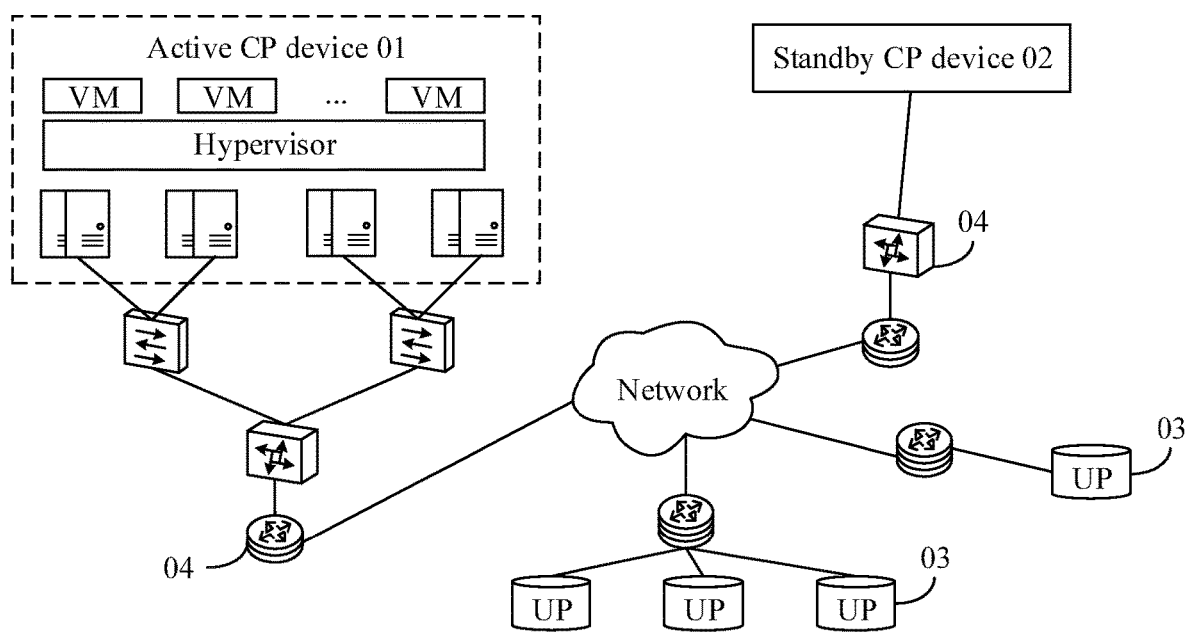
FIG. 1 is a schematic structural diagram of a forwarding-control separation system according to an embodiment of the present disclosure.

FIG. 1 is a schematic structural diagram of a forwarding-control separation system according to an embodiment of the present disclosure. As shown in FIG. 1, the system may include an active CP device 01, a standby CP device 02, and a plurality of UP devices 03. The active CP device 01 and the standby CP device 02 are usually deployed in a data center (DC) equipment room of an operator, which is also referred to as a core equipment room. In addition, the active CP device 01 and the standby CP device 02 are usually deployed in different DC equipment rooms. All data in the active CP device 01 is backed up in the standby CP device 02, so that remote disaster recovery protection can be implemented. The UP devices 03 may be distributed in different aggregation equipment rooms, which are also referred to as edge equipment rooms. Each CP device may communicate with each UP device 03 through a wide area network including a forwarding device 04 (for example, a router), and exchange data with each UP device 03. The active CP device 01 is responsible for user control and management. For example, in a BRAS system, the active CP device 01 is responsible for BRAS user login, configuration delivery, and forwarding entry delivery. Each UP device 03 is responsible for forwarding an actual user data packet (that is, a service packet).

In the forwarding-control separation system, the active CP device 01 may be implemented by using a cloudification technology. As shown in FIG. 1, the active CP device 01 may include a plurality of virtual machines (VMs) deployed on a physical server, and the plurality of VMs may be managed together by a hypervisor running on the physical server. An architecture of the standby CP device 02 may be similar to the architecture of the active CP device 01. Details are not described herein again.

Because the active CP device 01 and the UP device 03 are deployed at different network locations, data communication needs to be performed between the active CP device 01 and the UP device 03 through a wide area network such as a metropolitan area network or a backbone network. A problem that performance of communication between the active CP device 01 and the UP device 03 degrades because a network hardware fault or an unstable transmission link frequently occurs in the network. For example, when the network hardware fault occurs, an irregular packet loss may occur between the active CP device 01 and the UP device 03. Consequently, a data packet is continuously retransmitted between the active CP device 01 and the UP device 03, and normal processing performed by the active CP device 01 on a user service is affected.

Figure 2:
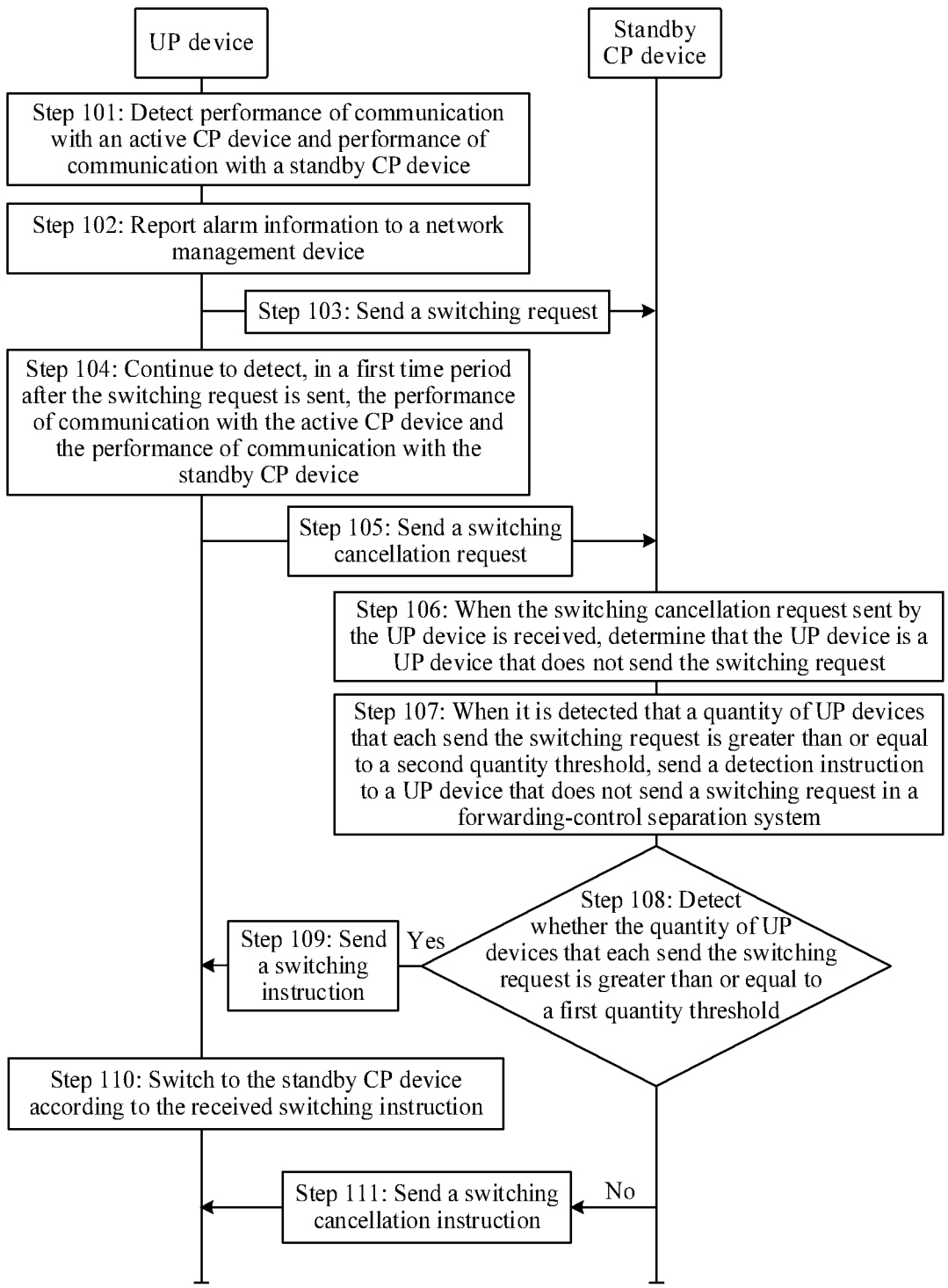
FIG. 2 is a flowchart of a CP device switching method according to an embodiment of the present disclosure.

An embodiment of the present disclosure provides a CP device switching method, to resolve problems in a related technology that a switching method has relatively low flexibility and normal processing of a user service is affected because performance of communication between an active CP device and a UP device degrades. The CP device switching method may be applied to the forwarding-control separation system shown in FIG. 1, for example, may be applied to a BRAS system. Referring to FIG. 2, the method may include the following steps.

Step 101: A UP device detects performance of communication with an active CP device and performance of communication with a standby CP device.

In this embodiment of the present disclosure, in each UP device in the forwarding-control separation system, an end-to-end performance detection protocol for communication between the UP device and the active CP device and communication between the UP device and the standby CP device may be deployed. The performance detection protocol may include any one of a Network Quality Analysis (NQA) protocol, a Request for Comments (RFC) 2544 protocol, a Two-Way Active Measurement Protocol (TWAMP), a Packet Internet Groper (PING) protocol, and the like. Each UP device may detect the performance of communication between the UP device and the active CP device and the performance of communication between the UP device and the standby CP device according to the performance detection protocol, and detect whether the communication performance meets a normal communication condition. The normal communication condition may be preset based on a performance requirement of the forwarding-control separation system. Optionally, if the performance detection protocol is a two-way detection protocol such as the NQA protocol, the RFC 2544 protocol, or the TWAMP, corresponding performance detection protocols also need to be deployed in the active CP device and the standby CP device. If the performance detection protocol is a one-way detection protocol such as the PING protocol, the performance detection protocol may be deployed only in the UP device.

When the UP device detects performance of communication between the UP device and a CP device, the UP device may detect a value of at least one communication performance parameter of communication between the UP device and the CP device. That the performance of communication between the UP device and the CP device meets the normal communication condition may mean that a quantity of communication performance parameters that are in the at least one communication performance parameter of communication between the UP device and the CP device and whose values are within a corresponding normal value range is greater than or equal to a preset quantity threshold. Correspondingly, that the performance of communication between the UP device and the CP device does not meet the normal communication condition may mean that a quantity of communication performance parameters that are in the at least one communication performance parameter of communication between the UP device and the CP device and whose values are within a corresponding normal value range is less than the preset quantity threshold.

The at least one communication performance parameter may include at least one of a packet loss rate, a packet error ratio, and a communication delay. The preset quantity threshold may be flexibly adjusted based on an application scenario and an application requirement. For example, the preset quantity threshold may be 1. In this case, when the UP device detects that a value of any communication performance parameter of communication between the UP device and the active CP device is within the corresponding value range, the UP device may determine that the performance of communication between the UP device and the active CP device meets the normal communication condition. Alternatively, the preset quantity threshold may be equal to a quantity of communication performance parameters detected by the UP device. In this case, when the UP device detects that a value of any communication performance parameter of communication between the UP device and the active CP device is not within the corresponding value range, the UP device may determine that the performance of communication between the UP device and the active CP device does not meet the normal communication condition.

In this embodiment of the present disclosure, when detecting that the performance of communication between the UP device and the active CP device does not meet the normal communication condition, and the performance of communication between the UP device and the standby CP device does not meet the normal communication condition either, the UP device may perform step 102. When detecting that the performance of communication between the UP device and the active CP device does not meet the normal communication condition, and the performance of communication between the UP device and the standby CP device meets the normal communication condition, the UP device may perform step 103. When detecting that the performance of communication between the UP device and the active CP device meets the normal communication condition, the UP device may keep a current state, and that the UP device keeps a current state may mean that the UP device does not continue to perform the method in any one of step 103 to step 105.

For example, if the NQA protocol is deployed in each UP device, the UP device may separately obtain, according to the NQA protocol, a value of at least one communication performance parameter of communication between the UP device and the active CP device and a value of at least one communication performance parameter of communication between the UP device and the standby CP device, and detect whether the obtained value of each communication performance parameter is within the normal value range indicated by the normal communication condition. It is assumed that the communication performance parameter detected by the UP device includes three communication performance parameters: the packet loss rate, the packet error ratio, and the communication delay. If the preset quantity threshold is equal to a quantity of communication performance parameters detected by the UP device, in other words, the preset quantity threshold is equal to 3, when the UP device detects that a packet loss rate between the UP device and a specific CP device is not greater than a maximum packet loss rate threshold, a packet error ratio is not greater than a maximum packet error ratio threshold, and a communication delay is not greater than a maximum communication delay threshold, the UP device may determine that performance of communication between the UP device and the CP device meets the normal communication condition. If the UP device detects that a value of any communication performance parameter of communication between the UP device and the CP device is greater than a corresponding maximum threshold, the UP device may determine that the performance of communication between the UP device and the CP device does not meet the normal communication condition.

Optionally, if the communication performance parameter detected by the UP device includes the packet loss rate, when the UP device calculates the packet loss rate, the UP device may determine, through statistics collection, that both a wrong data packet and a data packet with an excessively long communication delay are lost. Then, the UP device may calculate the packet loss rate based on a quantity of lost packets that is actually obtained through statistics collection and a quantity of lost packets that is obtained through statistics collection based on the wrong data packet and the data packet with an excessively long communication delay, and detect whether the packet loss rate is greater than the maximum packet loss rate threshold. The maximum packet loss rate threshold may be 50%.

In an optional implementation of this embodiment of the present disclosure, each UP device in the forwarding-control separation system may collect, in real time, statistics about a quantity of data packet retransmissions between the UP device and the active CP device, or may collect, at an interval of preset duration, statistics about a quantity of data packet retransmissions performed between the UP device and the active CP device within the preset duration. When detecting that the quantity of data packet retransmissions performed between the UP device and the active CP device within the preset duration is greater than or equal to a retransmission quantity threshold, the UP device may determine that the performance of communication between the UP device and the active CP device may degrade. Therefore, performance monitoring shown in step 101 may be triggered. To be specific, the UP device detects the performance of communication between the UP device and the active CP device and the performance of communication between the UP device and the standby CP device. Compared with a mechanism in which the UP device monitors the performance of communication between the UP device and the active CP device and the performance of communication between the UP device and the standby CP device in real time, in a mechanism of triggering performance monitoring based on the quantity of retransmissions, fewer resources of the UP device may be occupied, so as to effectively reduce resource consumption of the UP device.

Both the preset duration and the retransmission quantity threshold may be preset based on a performance requirement of the forwarding-control separation system. For example, the preset duration may be 100 seconds, and the retransmission quantity threshold may be 3, or the preset duration may be 300 seconds, and the retransmission quantity threshold may be 10.

For example, the UP device may monitor in real time and collect statistics about a quantity of Transmission Control Protocol (TCP) data packet retransmissions between the UP device and the active CP device. It is assumed that the preset duration is 300 seconds, and the retransmission quantity threshold is 10. In this case, when a specific UP device detects that a quantity of TCP data packet retransmissions performed between the UP device and the active CP device within 300 seconds is greater than or equal to 10, the UP device may detect performance of communication between the UP device and the active CP device and performance of communication between the UP device and the standby CP device.

In another optional implementation of this embodiment of the present disclosure, after receiving a detection instruction sent by the standby CP device, the UP device in the forwarding-control separation system may alternatively trigger performance monitoring shown in step 101 according to the detection instruction.

Optionally, the detection instruction may be sent by the standby CP device to a UP device in the forwarding-control separation system when the standby CP device detects that a quantity of UP devices that each send a switching request is greater than or equal to a second quantity threshold, where the UP device does not send a switching request. Alternatively, the detection instruction may be periodically sent by the standby CP device to the UP device based on a preset detection period. For example, the standby CP device may send a detection instruction to each UP device in the forwarding-control separation system every one hour. Therefore, the standby CP device may monitor, by periodically sending the detection instruction to the UP device, the performance of communication between the UP device and the active CP device and the performance of communication between the UP device and the standby CP device.

In still another optional implementation of this embodiment of the present disclosure, each UP device in the forwarding-control separation system may alternatively monitor the performance of communication between the UP device and the active CP device and the performance of communication between the UP device and the standby CP device in real time.

Step 102: The UP device reports alarm information to a network management device.

In this embodiment of the present disclosure, the network management device configured to monitor performance of each device in the system may be further deployed in the forwarding-control separation system, and the network management device may be monitored by a network administrator in real time. When the UP device detects that neither of the performance of communication between the UP device and the active CP device and the performance of communication between the UP device and the standby CP device meets the normal communication condition, the UP device may report the alarm information to the network management device. The alarm information is used to indicate that communication of the UP device is abnormal, so that the network administrator that monitors the network management device can detect and repair, based on the alarm information, the UP device or network hardware connected to the UP device.

Step 103: The UP device sends a switching request to the standby CP device, and then performs step 104.

When the UP device detects that the performance of communication between the UP device and the active CP device does not meet the normal communication condition, and the performance of communication between the UP device and the standby CP device meets the normal communication condition, to prevent normal user service processing by the active CP device from being affected when the communication performance degrades, the UP device may send the switching request to the standby CP device, and the standby CP device may receive the switching request sent by the UP device. The switching request sent by the UP device may be used to request to switch to the standby CP device.

Step 104: The UP device continues to detect, within a first time period after the UP device sends the switching request to the standby CP device, the performance of communication between the UP device and the active CP device and the performance of communication between the UP device and the standby CP device.

In this embodiment of the present disclosure, to ensure communication performance detection accuracy, the UP device may continue to detect, within the first time period after the UP device sends the switching request, the performance of communication between the UP device and the active CP device and the performance of communication between the UP device and the standby CP device. When the UP device detects, within the first time period, that the performance of communication between the UP device and the active CP device meets the normal communication condition, the UP device may determine that the UP device can normally communicate with the active CP device, and does not need to switch to the standby CP device. Therefore, the UP device may perform step 105. If the UP device does not detect, within the first time period, that the performance of communication between the UP device and the active CP device meets the normal communication condition, the UP device may keep the current state unchanged.

The first time period may be preset in the UP device, for example, may be 10 seconds or 1 minute. This is not limited in this embodiment of the present disclosure.

Step 105: Send a switching cancellation request to the standby CP device.

When the UP device detects, within the first time period, that the performance of communication between the UP device and the active CP device meets the normal communication condition, the UP device may determine that the performance of communication between the UP device and the active CP device is recovered, or may determine that a previous detection result is wrong. Therefore, the UP device may send the switching cancellation request to the standby CP device, and the standby CP device may receive the switching cancellation request sent by the UP device. The switching cancellation request may be used to indicate the UP device to withdraw the previously sent switching request. Therefore, after receiving the switching cancellation request, the standby CP device may determine that the UP device is a UP device that does not send a switching request.

Optionally, after step 102, the UP device may alternatively perform step 104. To be specific, the UP device may continue to detect, within the first time period after the UP device reports the alarm information, the performance of communication between the UP device and the active CP device and the performance of communication between the UP device and the standby CP device. Likewise, when detecting, within the first time period, that the performance of communication between the UP device and the active CP device meets the normal communication condition, the UP device may send alarm cancellation information to the network management device. The alarm cancellation information is used to indicate the UP device to withdraw the previously sent alarm information.

Step 106: When receiving the switching cancellation request sent by the UP device, the standby CP device determines that the UP device is the UP device that does not send the switching request.

After the standby CP device receives, in step 103, the switching request sent by the UP device, the standby CP device may collect statistics about a quantity of UP devices that each send the switching request. In the statistics collection process, if the standby CP device receives the switching cancellation request sent by the UP device that sends the switching request, because the switching cancellation request is used to indicate the UP device to withdraw the previously sent switching request, the standby CP device may determine that the UP device that sends the switching cancellation request is the UP device that does not send a switching request. In other words, when the standby CP device collects statistics about the quantity of UP devices that each send a switching request, the standby CP device does not collect statistics about a UP device that sends a switching request and then sends a switching cancellation request.

For example, if one UP device sends a switching request for a plurality of times, in this embodiment of the present disclosure, the standby CP device may collect statistics about a quantity of UP devices that each send a switching request, but not collect statistics about a quantity of received switching requests. Therefore, when one UP device sends a switching request for a plurality of times, the standby CP device may perform statistics collection only once. This ensures accuracy of a statistical result. In another embodiment, if one UP device sends a switching request only once, the standby CP device may also collect statistics about a quantity of received switching requests.

Step 107: When detecting that the quantity of UP devices that each send a switching request is greater than or equal to the second quantity threshold, the standby CP device sends a detection instruction to a UP device that does not send a switching request in the forwarding-control separation system, and then performs step 108.

The second quantity threshold may be determined based on a total quantity of UP devices included in the forwarding-control separation system, for example, may be 30% or 35% of the total quantity of UP devices. When the standby CP device detects that the quantity of UP devices that each send a switching request is greater than or equal to the second quantity threshold, the standby CP device may determine that performance of communication between each of a relatively large quantity of UP devices and the active CP device in the forwarding-control separation system degrades. To further determine performance of communication between another UP device and the active CP device to ensure switching reliability, the standby CP device may send a detection instruction to a UP device that is in a plurality of UP devices included in the forwarding-control separation system and that does not send a switching request, and the detection instruction may be used to instruct the UP device that does not send a switching request to detect performance of communication between the UP device and the active CP device and performance of communication between the UP device and the standby CP device.

Correspondingly, after receiving the detection instruction, the UP device that does not send a switching request in the forwarding-control separation system may perform the method in step 101 and the methods in step 102 to step 105 according to the detection instruction, and details are not described herein again.

For example, it is assumed that the total quantity of UP devices included in the forwarding-control separation system is 100, and the second quantity threshold M2 is 30. If the standby CP device detects that a quantity of UP devices that each send a switching request currently is 31, the standby CP device may send a detection instruction to each of remaining 69 UP devices that each do not send a switching request in the forwarding-control separation system. Each UP device that receives the detection instruction may separately perform the methods in step 101 to step 105.

Step 108: The standby CP device detects whether the quantity of UP devices that each send a switching request is greater than or equal to a first quantity threshold.

In this embodiment of the present disclosure, the standby CP device may collect statistics about the quantity of UP devices that each send a switching request, and detect whether the quantity of UP devices that each send a switching request is greater than or equal to the first quantity threshold. For example, the standby CP device may continuously collect statistics about the quantity of UP devices that each send a switching request, and continuously detect whether the quantity of UP devices that each send the switching request is greater than or equal to the first quantity threshold. Alternatively, the standby CP device may detect whether a quantity of UP devices that each send the switching request within a specified time period is greater than or equal to the first quantity threshold.

When the standby CP device detects that the quantity of UP devices that each send the switching request is greater than or equal to the first quantity threshold, the standby CP device may perform step 109. When the standby CP device detects that the quantity of UP devices that each send the switching request is less than the first quantity threshold, the standby CP device may perform step 111.

In a case in which the standby CP device detects whether the quantity of UP devices that each send the switching request within the specified time period is greater than or equal to the first quantity threshold, if the standby CP device does not perform the method in step 107, the specified time period may be a time period starting from a moment at which the standby CP device receives the first switching request, or may be a time period starting from a moment at which a switching cancellation instruction is sent last time. Alternatively, in a case in which the standby CP device periodically sends a detection instruction, the specified time period may be a time period starting from a moment at which the detection instruction is sent. For example, duration of the specified time period may be 30 seconds or 1 minute.

Alternatively, in a case in which the standby CP device detects whether the quantity of UP devices that each send the switching request within the specified time period is greater than or equal to the first quantity threshold, if the standby CP device performs the method in step 107, the standby CP device may wait for each UP device to send a switching request within a second time period after the standby CP device sends the detection instruction. To be specific, after sending the detection instruction, the standby CP device may start a waiting time window whose duration is the second time period, and collect statistics about a quantity of UP devices that each send a switching request in the waiting time window. In this case, the specified time period may be the second time period, or may include the second time period and a time period that is required by the standby CP device to detect that the quantity of UP devices that each send a switching request is greater than or equal to the second quantity threshold in step 107. Duration of the second time period may be set according to an actual requirement of the forwarding-control separation system, for example, may be 10 seconds, 30 seconds, or 1 minute. After the second time period, the standby CP device may detect whether the quantity of UP devices that each send a switching request is greater than or equal to the first quantity threshold.

In a case in which the standby CP device performs the method in step 107, in an optional implementation, the standby CP device may detect whether a sum of a quantity m1 of UP devices that each send the switching request before the standby CP device sends the detection instruction and a quantity m2 of UP devices that each send the switching request within a second time period after the standby CP device sends the detection instruction is greater than or equal to the first quantity threshold M1. In other words, the standby CP device may detect whether m1+m2 is greater than or equal to M1, and may perform step 109 when detecting that m1+m2 is greater than or equal to M1. It can be learned that, in this implementation, the specified time period includes the second time period and a time period that is required by the standby CP device to detect that the quantity of UP devices that each send a switching request is greater than or equal to the second quantity threshold in step 107. The first quantity threshold M1 may be greater than the second quantity threshold M2, and the first quantity threshold M1 may also be determined based on a total quantity of UP devices included in the forwarding-control separation system. For example, the first quantity threshold M1 may be 50% of the total quantity of UP devices.

For example, it is assumed that the total quantity of UP devices included in the forwarding-control separation system is 100, the first quantity threshold M1 is 50, and the duration of the second time period is 10 seconds. In this case, the standby CP device may wait for 69 UP devices to send switching requests within 10 seconds after the standby CP device sends a detection instruction to each of the 69 UP devices.

If the standby CP device detects that the quantity m2 of UP devices that each send the switching request within 10 seconds is 25, because the quantity m1 that is of UP devices that each send a switching request and that is obtained by the standby CP device through statistics collection before the standby CP device sends the detection instruction is 31, the standby CP device may determine that the sum m1+m2 of the quantity m1 and the quantity m2 is: 31+25=56. Because the quantity sum 56 is greater than the first quantity threshold 50, the standby CP device may perform step 109.

If the standby CP device detects that the quantity m2 of UP devices that each send a switching request within 10 seconds is 10, because the quantity m1 that is of UP devices that each send the switching request and that is obtained by the standby CP device through statistics collection before the standby CP device sends the detection instruction is 31, the standby CP device may determine that the sum m1+m2 of the quantity m1 and the quantity m2 is: 31+10=41. Because the quantity sum 41 is less than the first quantity threshold 50, the standby CP device may perform step 111.

In a case in which the standby CP device performs the method in step 107, in another optional implementation, the standby CP device may detect, after a second time period after the standby CP device sends the detection instruction, whether a quantity of UP devices that each send the switching request within the second time period is greater than or equal to the first quantity threshold. In other words, the standby CP device may detect whether m2 is greater than or equal to M1, and may perform step 109 when detecting that m2 is greater than or equal to M1. It can be learned that, in this implementation, the specified time period is the second time period. In addition, in this implementation, the first quantity threshold M1 may be determined based on a total quantity of UP devices included in the forwarding-control separation system, and a value relationship between the first quantity threshold M1 and the second quantity threshold M2 does not need to be limited, provided that a sum of the two values is less than the total quantity of UP devices. For example, the first quantity threshold M1 may be 20% of the total quantity of UP devices.

For example, it is assumed that the total quantity of UP devices included in the forwarding-control separation system is 100, the first quantity threshold M1 is 20, and the duration of the second time period is 10 seconds. If the standby CP device detects, beyond 10 seconds after the standby CP device sends a detection instruction to each of 69 UP devices, that the quantity m2 of UP devices that each send a switching request within 10 seconds is 23, because the quantity m2 is greater than the first quantity threshold 20, the standby CP device may perform step 109. If the standby CP device detects, within 10 seconds, that the quantity m2 of UP devices that each send a switching request is 15, because the quantity m2 is less than the first quantity threshold 20, the standby CP device may perform step 111.

Step 109: The standby CP device sends a switching instruction to each of the plurality of UP devices.

When the standby CP device detects, in step 108, that the quantity of UP devices that each send the switching request is greater than or equal to the first quantity threshold, the standby CP device may determine that performance of communication between the active CP device and each of a large quantity of UP devices degrades, and consequently a normal communication requirement cannot be met. Therefore, to prevent normal user service processing from being affected, the standby CP device may send the switching instruction to each of the plurality of UP devices included in the forwarding-control separation system, and each UP device may receive the switching instruction sent by the standby CP device. The switching instruction is used to instruct a UP device that receives the switching instruction to switch to the standby CP device, so that the standby CP device can replace the active CP device to process a user service and manage the plurality of UP devices in the forwarding-control separation system together. In other words, the standby CP device is upgraded to a new active CP device.

Optionally, in this embodiment of the present disclosure, when detecting that the quantity of UP devices that each send the switching request is greater than or equal to the first quantity threshold, the standby CP device may further send switching instruction information to the active CP device. The switching instruction information is used to notify the active CP device that the plurality of UP devices in the forwarding-control separation system will switch to the standby CP device. After receiving the switching instruction information, the active CP device may perform an action such as power-off or restart recovery.

Step 110: The UP device switches to the standby CP device according to the received switching instruction.

In this embodiment of the present disclosure, after receiving the switching instruction sent by the standby CP device, the UP device may switch to the standby CP device according to the switching instruction. In other words, the standby CP device replaces the active CP device to work.

Optionally, during deployment, each UP device may store identification information of the active CP device and identification information of the standby CP device, for example, may store an Internet Protocol (IP) address of each CP device. After receiving the switching instruction sent by the standby CP device, the UP device may check the standby CP device based on identification information of the standby CP device that is carried in the switching instruction. To be specific, the UP device detects whether the identification information of the standby CP device that is carried in the switching instruction is consistent with the identification information of the standby CP device that is pre-stored by the standby CP device. If the identification information of the standby CP device that is carried in the switching instruction is consistent with the identification information of the standby CP device that is pre-stored by the standby CP device, the UP device may determine that the check succeeds, and switch to the standby CP device. To be specific, the UP device may mark the standby CP device as a new active CP device, and forward a subsequently received data packet to the new active CP device. If the UP device detects that the identification information of the standby CP device that is carried in the switching instruction is inconsistent with the identification information of the standby CP device that is pre-stored by the standby CP device, the UP device may determine that the check fails, may not perform the switching operation, and may send the alarm information to the network management device.

When detecting that the performance of communication between the UP device and the active CP device does not meet the normal communication condition, and the performance of communication between the UP device and the standby CP device meets the normal communication condition, the UP device sends the switching request. Therefore, after the UP device switches to the standby CP device, it can be ensured that the UP device normally communicates with the standby CP device, and it can be further ensured that the standby CP device can normally process a user service. This ensures reliability of the forwarding-control separation system.

In a conventional solution, a wide area network between the UP device and the active CP device may also provide a reliability protection solution. For example, a network device in the wide area network may power off and isolate faulty network hardware when a packet loss is caused by a network hardware fault, or may trigger bit error linkage protection when a bit error occurs. However, in the foregoing reliability protection solution, a network device in the wide area network needs to have a fault detection function and a protection switching function, and a protection path exists between network devices, so as to ensure that a standby path is reachable after faulty network hardware or link is isolated. It can be learned from the foregoing analysis that the reliability protection solution provided by the wide area network has a relatively high network deployment requirement, high network deployment costs, and relatively low efficiency. In addition, when the foregoing reliability protection solution is not available in the wide area network, an operation personnel can only perform troubleshooting after perceiving that a user service is damaged, and then perform manual switching between the active CP device and the standby CP device after a fault is located. The manual switching solution of the operation personnel has relatively low efficiency and cannot rectify a fault in time.

However, in this embodiment of the present disclosure, the UP device detects the performance of communication between the UP device and the active CP device and the performance of communication between the UP device and the standby CP device and reports the switching request, and then the standby CP device triggers CP device switching based on a quantity of UP devices that each send a switching request. Therefore, it can be ensured that performance of communication between the UP device and a CP device can meet the normal communication condition, normal user service processing is prevented from being affected, and the reliability of the forwarding-control separation system is effectively improved. In addition, according to the switching method provided in this embodiment of the present disclosure, dependency on a reliability protection solution provided by a wide area network between the UP device and a CP device is alleviated. Regardless of whether the wide area network provides the reliability protection solution, the control plane device switching method provided in this embodiment of the present disclosure may be used, and the method has relatively high application flexibility.

Step 111: The standby CP device sends a switching cancellation instruction to each UP device that sends the switching request.

When the standby CP device detects, in step 108, that the quantity of UP devices that each send the switching request within the specified time period is less than the first quantity threshold, the standby CP device may determine that performance of communication between the active CP device and each of a large quantity of UP devices can meet the normal communication requirement. Therefore, the standby CP device may send the switching cancellation instruction to each UP device that sends the switching request, and the UP device may receive the switching cancellation instruction. The switching cancellation instruction may be used to indicate that a switching condition is not met currently.

In an optional implementation, the standby CP device may send the switching cancellation instruction to each of all UP devices that each send the switching request. To be specific, regardless of whether the UP device sends the switching cancellation request, the standby CP device may send the switching cancellation instruction to the UP device in step 111 when the UP device sends the switching request.

In another optional implementation, the standby CP device may send the switching cancellation instruction only to a UP device that is determined by the standby CP device and that sends a switching request. In other words, if a specific UP device sends a switching cancellation request after sending a switching request, because the standby CP device determines that the UP device is a UP device that does not send a switching request, the standby CP device does not need to send the switching cancellation instruction to the UP device in step 111.

After the UP device receives the switching cancellation instruction, if the first time period still does not expire, the UP device may stop detecting the performance of communication between the UP device and the active CP device and the performance of communication between the UP device and the standby CP device. If the first time period expires, in an optional implementation, the UP device may keep a current state unchanged. In another optional implementation, the UP device may alternatively perform the method in step 105. In other words, the UP device may send the switching cancellation request to the standby CP device. Accordingly, after receiving the switching cancellation request, the standby CP device may perform the method in step 107. In other words, the standby CP device determines that the UP device is a UP device that does not send a switching request. In addition, after performing the foregoing operation, the UP device may start a next round of detection based on the switching cancellation instruction. In other words, the UP device continues to perform the methods in step 101 to step 105. Accordingly, the standby CP device may continue to perform the methods in step 106 to step 108 based on the received switching request sent by the UP device.

Optionally, if the UP device keeps the current state unchanged after receiving the switching cancellation instruction, in step 107 or step 108, when the standby CP device collects statistics about the quantity of UP devices that each send a switching request, the standby CP device may start to collect statistics from a moment at which the switching cancellation instruction is sent last time, or may collect statistics once at an interval of preset statistics collection duration (for example, 30 minutes or 1 hour). If the UP device sends the switching cancellation request to the standby CP device after receiving the switching cancellation request, in step 107 or step 108, the standby CP device may continuously collect statistics about the quantity of UP devices that each send a switching request.

Optionally, after step 109 and step 111, the standby CP device may further record related information of this detection operation, and may send the related information to the network management device, so that the network administrator may learn of a network status in time based on the related information, so as to determine whether manual intervention is required. The related information may include a final operation result and the quantity that is of UP devices that each send a switching request and that is detected by the standby CP device. The operation result is sending a switching instruction or sending a switching cancellation instruction.

It should be noted that a sequence of performing the steps of the control plane device switching method provided in this embodiment of the present disclosure may be properly adjusted, and a step may be correspondingly added or omitted according to a situation. For example, step 102 may be deleted according to a situation. To be specific, when detecting that performance of communication between the UP device and each CP device does not meet the normal communication condition, the UP device may keep the current state unchanged. Alternatively, step 104 and step 105 may be deleted according to a situation. Alternatively, step 106 and step 107 may be deleted according to a situation. To be specific, the standby CP device may directly detect whether the quantity of UP devices that each send a switching request is greater than or equal to the first quantity threshold. Alternatively, step 111 may be deleted according to a situation. To be specific, when detecting that the quantity of UP devices that each send a switching request within the specified time period is less than the first quantity threshold, the standby CP device may not send the switching cancellation instruction. Any variation readily figured out by a person skilled in the art within the technical scope disclosed in this application shall fall within the protection scope of this application, and details are not described herein.

In conclusion, this embodiment of the present disclosure provides the control plane device switching method. When the UP device in the forwarding-control separation system detects that the performance of communication between the UP device and the active CP device does not meet the normal communication condition, and the performance of communication between the UP device and the standby CP device meets the normal communication condition, the UP device may send the switching request to the standby CP device. When the standby CP device detects that the quantity of UP devices that each send the switching request is greater than or equal to the first quantity threshold, the standby CP device may indicate each UP device in the forwarding-control separation system to switch to the standby CP device. Therefore, when performance of communication between the active CP device and each of a large quantity of UP devices degrades, and performance of communication between the standby CP device and each of the large quantity of UP devices is relatively good, each UP device may switch to the standby CP device, so that the standby CP device can replace the active CP device to work. This ensures normal user service running. Compared with the method in the related technology, the control plane device switching method provided in this embodiment of the present disclosure not only has relatively high flexibility, but also can effectively improve the reliability of the forwarding-control separation system.

Figure 3:
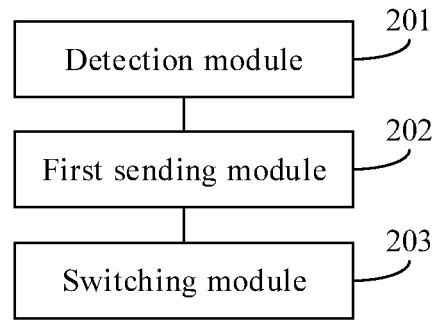
FIG. 3 is a schematic structural diagram of a UP device according to an embodiment of the present disclosure.

FIG. 3 is a schematic structural diagram of a UP device according to an embodiment of the present disclosure. The UP device may be applied to a forwarding-control separation system, for example, may be applied to the BRAS system shown in FIG. 1. Referring to FIG. 1, the forwarding-control separation system may further include the active CP device 01 and the standby CP device 02. As shown in FIG. 3, the UP device may include a detection module 201, a first sending module 202, and a switching module 203.

The detection module 201 may be configured to implement the method shown in step 101 in the foregoing method embodiment.

The first sending module 202 may be configured to implement the method shown in step 103 in the foregoing method embodiment.

The switching module 203 may be configured to implement the method shown in step 110 in the foregoing method embodiment.

In an optional implementation, the detection module 201 may be configured to, when detecting that a quantity of data packet retransmissions performed between the UP device and the active CP device within preset duration is greater than or equal to a retransmission quantity threshold, detect performance of communication with the active CP device and performance of communication with the standby CP device.

In this embodiment of the present disclosure, the detection module 201 in the UP device may include two detection submodules. One detection submodule may be configured to detect the quantity of data packet retransmissions between the UP device and the active CP device. The other detection submodule may be provided with a performance detection protocol, and may detect the performance of communication with the active CP device and the performance of communication with the standby CP device based on the performance detection protocol. For example, the other detection submodule may detect communication performance parameters such as a packet loss rate, a packet error ratio, and a communication delay of communication between the UP device and each CP device.

In another optional implementation, the detection module 201 may be configured to, after a detection instruction sent by the standby CP device is received, detect the performance of communication with the active CP device and the performance of communication with the standby CP device.

Figure 4:
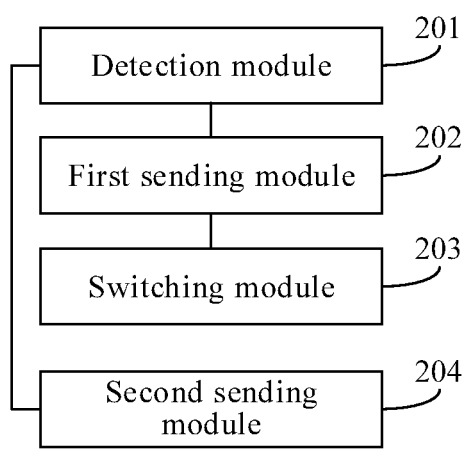
FIG. 4 is a schematic structural diagram of another UP device according to an embodiment of the present disclosure.

Optionally, the forwarding-control separation system may further include a network management device. As shown in FIG. 4, the UP device may further include a second sending module 204.

The second sending module 204 may be configured to implement the method shown in step 102 in the foregoing method embodiment.

Optionally, the detection module 201 may be further configured to implement the method shown in step 104 in the foregoing method embodiment.

The first sending module 202 may be further configured to implement the method shown in step 105 in the foregoing method embodiment.

In conclusion, this embodiment of the present disclosure provides the user plane device. When detecting that the performance of communication between the user plane device and the active CP device does not meet the normal communication condition, and the performance of communication between the user plane device and the standby CP device meets the normal communication condition, the user plane device may send the switching request to the standby CP device, and may switch to the standby CP device according to the switching instruction sent by the standby CP device. Therefore, when performance of communication between the active CP device and each of a large quantity of UP devices degrades, and performance of communication between the standby CP device and each of the large quantity of UP devices is relatively good, each UP device may switch to the standby CP device, so that the standby CP device can replace the active CP device to work. This ensures normal user service running, thereby effectively improving reliability of the forwarding-control separation system.

Figure 5:
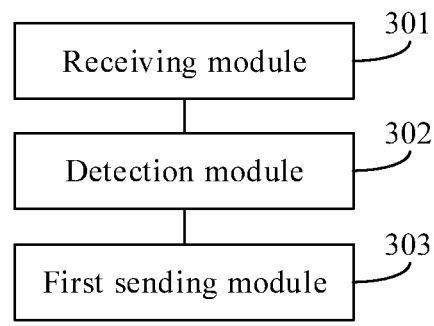
FIG. 5 is a schematic structural diagram of a standby CP device according to an embodiment of the present disclosure.

FIG. 5 is a schematic structural diagram of a standby CP device according to an embodiment of the present disclosure. The standby CP device may be applied to a forwarding-control separation system, for example, may be applied to the BRAS system shown in FIG. 1. Referring to FIG. 1, the forwarding-control separation system may further include the active CP device 01 and the plurality of UP devices 03. As shown in FIG. 5, the standby CP device may include a receiving module 301, a detection module 302, and a first sending module 303.

The receiving module 301 may be configured to receive a switching request sent by at least one UP device, where the switching request sent by any UP device may indicate that performance of communication between the any UP device and the active CP device does not meet a normal communication condition, and performance of communication between the any UP device and the standby CP device meets the normal communication condition.

The detection module 302 may be configured to implement the method shown in step 108 in the foregoing method embodiment.

The first sending module 303 may be configured to implement the method shown in step 109 in the foregoing method embodiment.

Figure 6:
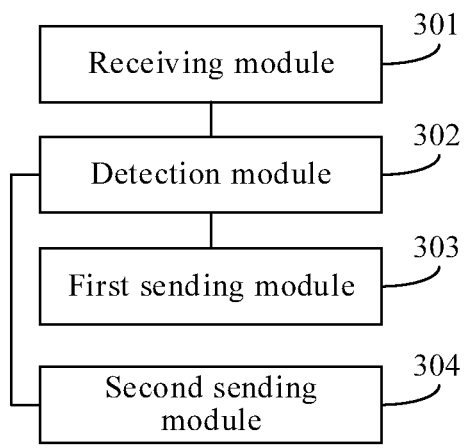
FIG. 6 is a schematic structural diagram of another standby CP device according to an embodiment of the present disclosure.

Optionally, as shown in FIG. 6, the standby CP device may further include a second sending module 304.

The second sending module 304 may be configured to implement the method shown in step 107 in the foregoing method embodiment.

In an optional implementation, the detection module 302 may be configured to detect whether a sum of a quantity of user plane devices that each send the switching request before the detection instruction is sent and a quantity of user plane devices that each send the switching request within a second time period after the detection instruction is sent is greater than or equal to the first quantity threshold in step 108.

The first quantity threshold in step 108 is greater than the second quantity threshold in step 107.

In another optional implementation, the detection module 302 may be configured to detect, beyond a second time period after the detection instruction is sent, whether a quantity of user plane devices that each send the switching request within the second time period is greater than or equal to the first quantity threshold in step 108.

Optionally, the first sending module 303 may be further configured to implement the method shown in step 111 in the foregoing method embodiment.

Optionally, the detection module 302 may be further configured to implement the method shown in step 106 in the foregoing method embodiment.

In this embodiment of the present disclosure, if a performance detection protocol configured in the UP device is a two-way detection protocol, the standby CP device may further include a performance detection module, and the performance detection module may be provided with a corresponding performance detection protocol. When the UP device detects performance of communication between the UP device and the standby CP device based on the performance detection protocol, the performance detection module may be configured to respond to a performance detection request sent by the UP device.

In conclusion, this embodiment of the present disclosure provides the standby control plane device. After receiving a switching request sent by each of a large quantity of UP devices, the standby control plane device indicates each UP device in the forwarding-control separation system to switch to the standby CP device. Therefore, when performance of communication between the active CP device and each of the large quantity of UP devices degrades, and performance of communication between the standby CP device and each of the large quantity of UP devices is relatively good, the standby CP device may replace the active CP device to work. This ensures normal user service running, thereby effectively improving reliability of the forwarding-control separation system.

Figure 7:
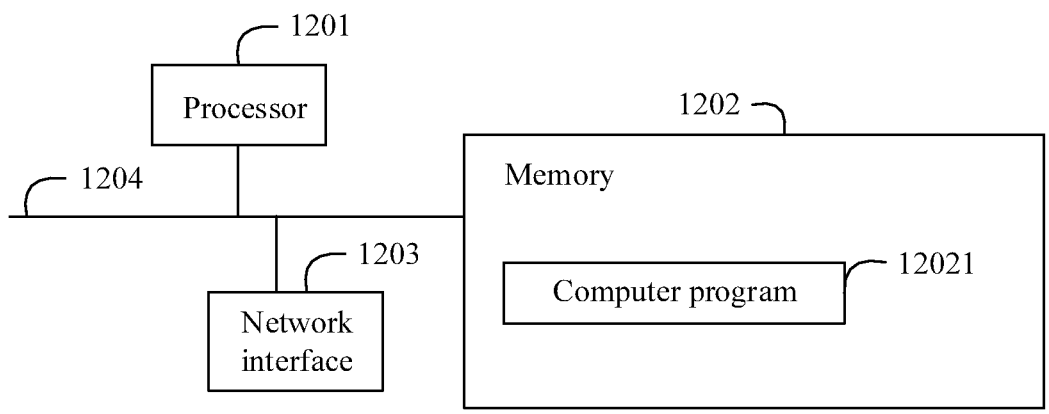
FIG. 7 is a schematic structural diagram of a CP device switching apparatus according to an embodiment of the present disclosure.

An embodiment of the present disclosure further provides a CP device switching apparatus. The switching apparatus may be applied to a standby CP device or a UP device in a forwarding-control separation system. As shown in FIG. 7, the apparatus may include a processor 1201 (for example, a central processing unit (CPU)), a memory 1202, a network interface 1203, and a bus 1204. The bus 1204 is configured to connect the processor 1201, the memory 1202, and the network interface 1203. The memory 1202 may include a random-access memory (RAM), or may include a nonvolatile memory, for example, at least one magnetic disk storage. A communication connection between a server and a communications device is implemented by using the network interface 1203 (in a wired or wireless manner). The memory 1202 stores a computer program 12021, and the computer program 12021 is configured to implement various application functions.

When the switching apparatus is applied to the UP device, the processor 1201 may be configured to execute the computer program 12021 stored in the memory 1202, to implement the method performed by the UP device in the method provided in the foregoing method embodiment. When the switching apparatus is applied to the standby CP device, the processor 1201 may be configured to execute the computer program 12021 stored in the memory 1202, to implement the method performed by the standby CP device in the method provided in the foregoing method embodiment.

An embodiment of the present disclosure further provides a forwarding-control separation system. Referring to FIG. 1, the forwarding-control separation system may include the active CP device 01, the standby CP device 02, and the plurality of UP devices 03. The standby CP device 02 may be the device shown in FIG. 5 or FIG. 6, and each UP device 03 may be the device shown in FIG. 3 or FIG. 4.

An embodiment of the present disclosure further provides a computer-readable storage medium. The computer-readable storage medium stores an instruction. When the computer-readable storage medium is run on a computer, the computer is enabled to perform the control plane device switching method provided in the foregoing method embodiment.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of the present disclosure are all or partially generated. The computer may be a general purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method implemented by a first user plane (UP) device in a forwarding-control separation system, wherein the method comprises:
   detecting a first performance of communication of the first UP device with an active control plane (CP) device in the forwarding-control separation system and a second performance of communication of the first UP device with a standby CP device in the forwarding-control separation system;
   sending a switching request to the standby CP device when the first performance of communication does not meet a normal communication condition and when the second performance of communication meets the normal communication condition;
   receiving, from the standby CP device, a switching instruction when a first quantity of second UP devices sending the switching request is greater than or equal to a first quantity threshold; and
   switching, in response to the switching instruction, to the standby CP device.

2. The method of claim 1, further comprising:
   detecting that a second quantity of data packet retransmissions between the first UP device and the active CP device within a preset duration is greater than or equal to a retransmission quantity threshold; and
   further detecting, in response to detecting that the second quantity is greater than or equal to the retransmission quantity threshold, the first performance of communication and the second performance of communication.

3. The method of claim 1, further comprising:
   receiving a detection instruction from the standby CP device; and
   further detecting, in response to the detection instruction, the first performance of communication and the second performance of communication.

4. The method of claim 1, further comprising:
   detecting that the first performance of communication and the second performance of communication do not meet the normal communication condition; and
   reporting, in response to the first performance of communication and the second performance of communication not meeting the normal communication condition, alarm information indicating that a communication of the first UP device is abnormal to a network management device in the forwarding-control separation system.

5. The method of claim 1, further comprising:
   continuing to detect, within a time period after sending the switching request, the first performance of communication and the second performance of communication;
   detecting, within the time period, that the first performance of communication meets the normal communication condition; and
   sending, in response to the first performance of communication meeting the normal communication condition, a switching cancellation request to the standby CP device.

6. The method of claim 1, further comprising detecting a first value of at least one communication performance parameter of the first UP device communication with the active CP device and a second value of the at least one communication performance parameter of the first UP device communication with the standby CP device, wherein meeting the normal communication condition comprises a third quantity of communication performance parameters, that are in the at least one communication performance parameter and comprising corresponding third values that are within a corresponding normal value range, being greater than or equal to a preset quantity threshold, and wherein not meeting the normal communication condition comprises a fourth quantity of communication performance parameters, that are in the at least one communication performance parameter and comprising corresponding fourth values that are within the corresponding normal value range, being less than the preset quantity threshold.

7. A method implemented by a standby control plane (CP) device in a forwarding-control separation system, wherein the method comprises:
   receiving a switching request from a first user plane (UP) device of a plurality of second UP devices in the forwarding-control separation system, wherein the switching request indicates that a first performance of communication between the first UP device and an active CP device in the forwarding-control separation system does not meet a normal communication condition and a second performance of communication between the first UP device and the standby CP device meets the normal communication condition;

detecting whether a quantity of third UP devices sending the switching request is greater than or equal to a first quantity threshold; and sending, to each of the second UP devices, a switching instruction instructing to switch to the standby CP device when the quantity is greater than or equal to the first quantity threshold.

8. The method of claim 7, further comprising:
sending, before detecting whether the quantity is greater than or equal to the first quantity threshold, a detection instruction to a fourth UP device in the second UP devices that does not send the switching request when the quantity is greater than or equal to a second quantity threshold, wherein the detection instruction instructs the fourth UP device to detect a third performance of communication between the fourth UP device and the active CP device and a fourth performance of communication between the fourth UP device and the standby CP device, and wherein the first quantity threshold is greater than the second quantity threshold; and detecting whether a sum of a second quantity of UP devices sending the switching request before the detection instruction is sent and a third quantity of UP devices sending the switching request within a first time period after the detection instruction is sent is greater than or equal to the first quantity threshold.

9. The method of claim 7, further comprising:
sending, before detecting whether the quantity is greater than or equal to the first quantity threshold, a detection instruction to a fourth UP device in the second UP devices and that does not send the switching request when the quantity is greater than or equal to a second quantity threshold, wherein the detection instruction instructs the fourth UP device to detect a third performance of communication between the fourth UP device and the active CP device and a fourth performance of communication between the fourth UP device and the standby CP device; and detecting, beyond a first time period after the detection instruction is sent, whether a fifth quantity of UP devices sending the switching request within the first time period is greater than or equal to the first quantity threshold.

10. The method of claim 7, further comprising:
detecting whether a sixth quantity of UP devices sending the switching request within a second time period is greater than or equal to the first quantity threshold; and sending, to each of the third UP devices, a switching cancellation instruction the sixth quantity is less than the first quantity threshold.

11. The method of claim 7, wherein after receiving the switching request, the method further comprises:
receiving a switching cancellation request from the first UP device; and setting, in response to the receiving, the first UP device as a fourth UP device that does not send the switching request.

12. The method of claim 7, wherein the forwarding-control separation system is a forwarding-control separation broadband remote access server system.

13. A first user plane (UP) device in a forwarding-control separation system, comprising:
a memory configured to store a program code; and
a processor coupled to the memory, wherein the program code causes the processor to be configured to:
detect a first performance of communication of the first UP device with an active control plane (CP) device and a second performance of communication of the first UP device with a standby CP device;

send a switching request to the standby CP device when the first performance of communication does not meet a normal communication condition and when the second performance of communication meets the normal communication condition; and receive, from the standby CP device, a switching instruction when a quantity of second UP devices sending the switching request is greater than or equal to a first quantity threshold; and switch, in response to the switching instruction, to the standby CP device.

14. The first UP device of claim 13, wherein the program code further causes the processor to be configured to:
detect that a second quantity of data packet retransmissions between the first UP device and the active CP device within a preset duration is greater than or equal to a retransmission quantity threshold; and detect, in response to detecting that the second quantity is greater than or equal to the retransmission quantity threshold, the first performance of communication and the second performance of communication.

15. The first UP device of claim 13, wherein the program code further causes the processor to be configured to:
receive, from the standby CP device, a detection instruction; and detect, in response to the detection instruction, the first performance of communication and the second performance of communication.

16. The first UP device of claim 13, wherein the program code further causes the processor to be configured to:
continue to detect, within a time period after sending the switching request, the first performance of communication and the second performance of communication;

detect, within the time period, that the first performance of communication meets the normal communication condition; and send, in response to the first performance of communication meets the normal communication condition, a switching cancellation request to the standby CP device.

17. The first UP device of claim 13, wherein the program code further causes the processor to be configured to detect a first value of at least one communication performance parameter of the first UP device communication with the active CP device and a second value of the at least one communication performance parameter of the first UP device communication with the standby CP device, wherein meeting the normal communication condition comprises a third quantity of communication performance parameters, that are in the at least one communication performance parameter and comprising corresponding third values that are within a corresponding normal value range, is greater than or equal to a preset quantity threshold, and does not meet the normal communication condition comprises a fourth quantity of communication performance parameters, that are in the at least one communication performance parameter and comprising corresponding fourth values that are within the corresponding normal value range, is less than the preset quantity threshold.

18. A standby control plane (CP) device in a forwarding-control separation system, comprising:
a memory configured to store a program code; and
a processor coupled to the memory, wherein the program code causes the processor to be configured to:
receive, from a first user plane (UP) device of a plurality of second UP devices, a switching request indicating that a first performance of communication between the first UP device and an active CP device does not meet a normal communication condition and a second performance of communication between the first UP device and a standby CP device meets the normal communication condition;
detect whether a quantity of third UP devices sending the switching request is greater than or equal to a first quantity threshold; and
send, to each of the second UP devices, a switching instruction instructing to switch to the standby CP device when the quantity is greater than or equal to the first quantity threshold.

19. The standby CP device of claim 18, wherein the program code further causes the processor to be configured to:
send, before detecting whether the quantity is greater than or equal to the first quantity threshold, a detection instruction to a fourth UP device in the second UP devices and that does not send the switching request when the quantity is greater than or equal to a second quantity threshold, wherein the detection instruction instructs the fourth UP device to detect a third performance of communication between the fourth UP device and the active CP device and a fourth performance of communication between the fourth UP device and the standby CP device; and
detect whether a sum of a second quantity of UP devices sending the switching request before the detection instruction is sent and a third quantity of UP devices sending the switching request within a first time period after the detection instruction is sent is greater than or equal to the first quantity threshold.

20. The standby CP device of claim 18, wherein the program code further causes the processor to be configured to:
send, before detecting whether the quantity is greater than or equal to the first quantity threshold, a detection instruction to a fourth UP device in the second UP devices and that does not send the switching request when the quantity is greater than or equal to a second quantity threshold, wherein the detection instruction instructs the fourth UP device to detect a third performance of communication between the fourth UP device and the active CP device and a fourth performance of communication between the fourth UP device and the standby CP device; and
detect, beyond a first time period after the detection instruction is sent, whether a fifth quantity of UP devices sending the switching request within the first time period is greater than or equal to the first quantity threshold.

21. The standby CP device of claim 18, wherein the program code further causes the processor to be configured to:
detect whether a sixth quantity of UP devices sending the switching request within a second time period is greater than or equal to the first quantity threshold; and
send, to each of the third UP devices, a switching cancellation instruction when the sixth quantity is less than the first quantity threshold.

22. The standby CP device of claim 18, wherein the program code further causes the processor to be configured to:
receive a switching cancellation request from the first UP device; and
set, in response to receiving, the first UP device as a fourth UP device that does not send the switching request.

23. A forwarding-control separation system comprising:
an active control plane (CP) device;
a standby CP device; and
a plurality of second user plane (UP) devices communicatively coupled to the active CP device and the standby CP device and comprising a first UP device, wherein the first UP device is configured to:
detect a first performance of communication of the first UP device with the active CP device and a second performance of communication with the standby CP device;
determine that the first performance of communication does not meet a normal communication condition and the second performance of communication meets the normal communication condition; and
send a switching request to the standby CP device,
wherein the standby CP device is configured to:
receive a plurality of switching requests from a plurality of third UP devices;
determine whether a quantity of the third UP devices is greater than or equal to a first quantity threshold; and
send, to each of the second UP devices, a switching instruction when the quantity is greater than or equal to the first quantity threshold, and
wherein the first UP device is further configured to:
receive the switching instruction; and
switch, in response to receiving the switching instruction and according to the switching instruction, to the standby CP device.

* * * * *